US008892544B2

(12) United States Patent
Pendap et al.

(10) Patent No.: US 8,892,544 B2
(45) Date of Patent: Nov. 18, 2014

(54) TESTING EFFICIENCY AND STABILITY OF A DATABASE QUERY ENGINE (75) Inventors: Santosh Dattu Pendap, Fremont, CA (US); Sudipto Rai Chowdhuri, San Ramon, CA (US)

(73) Assignee: Sybase, Inc., Dublin, CA (US)

( * ) Notice: Subject to any disclaimer, the term of this patent is extended or adjusted under 35 U.S.C. 154(b) by 837 days.

(21) Appl. No.: 12/416,645

(22) Filed: Apr. 1, 2009

(65) Prior Publication Data
US 2010/0257154 A1 Oct. 7, 2010

(51) Int. Cl.
G06F 17/30 (2006.01)

(52) U.S. Cl.
CPC .............................. *G06F 17/30463* (2013.01)
USPC ........................................................ 707/718

(58) Field of Classification Search
USPC ............................................................ 707/718
See application file for complete search history.

(56) References Cited

U.S. PATENT DOCUMENTS

| | | | | |
|---|---|---|---|---|
| 6,622,140 | B1* | 9/2003 | Kantrowitz | 1/1 |
| 6,721,724 | B1* | 4/2004 | Galindo-Legaria et al. | 1/1 |
| 7,464,071 | B2* | 12/2008 | Galindo-Legaria et al. | 1/1 |
| 7,941,425 | B2* | 5/2011 | Sahu et al. | 707/718 |
| 7,958,113 | B2* | 6/2011 | Fan et al. | 707/718 |
| 2002/0138469 | A1* | 9/2002 | Horovitz et al. | 707/2 |
| 2003/0130993 | A1* | 7/2003 | Mendelevitch et al. | 707/3 |
| 2003/0221163 | A1* | 11/2003 | Glover et al. | 715/501.1 |
| 2005/0091196 | A1 | 4/2005 | Day et al. | |
| 2005/0125746 | A1* | 6/2005 | Viola et al. | 715/853 |
| 2006/0161423 | A1* | 7/2006 | Scott et al. | 704/10 |
| 2006/0212429 | A1 | 9/2006 | Bruno et al. | |
| 2007/0162425 | A1 | 7/2007 | Betawadkar-Norwood et al. | |
| 2008/0077580 | A1* | 3/2008 | Ozveren et al. | 707/5 |
| 2008/0195577 | A1* | 8/2008 | Fan et al. | 707/2 |
| 2008/0215535 | A1 | 9/2008 | Day et al. | |
| 2008/0222093 | A1* | 9/2008 | Fan et al. | 707/2 |
| 2008/0275870 | A1* | 11/2008 | Shanahan et al. | 707/5 |
| 2009/0030888 | A1* | 1/2009 | Sahu et al. | 707/5 |
| 2009/0132471 | A1* | 5/2009 | Brown et al. | 707/2 |
| 2009/0327216 | A1* | 12/2009 | Brown et al. | 707/2 |
| 2009/0327242 | A1* | 12/2009 | Brown et al. | 707/3 |
| 2010/0114868 | A1* | 5/2010 | Beavin et al. | 707/718 |
| 2010/0198810 | A1* | 8/2010 | Graefe et al. | 707/718 |

OTHER PUBLICATIONS

International Search Report and Written Opinion, dated Oct. 26, 2010, for PCT Appl. No. PCT/US2010/028666, 8 pages.

* cited by examiner

*Primary Examiner* — Ajay Bhatia
*Assistant Examiner* — Kurt Mueller
(74) *Attorney, Agent, or Firm* — Sterne, Kessler, Goldstein & Fox P.L.L.C.

(57) ABSTRACT

Systems, methods and computer program products for testing the stability and efficiency of a database query engine are described herein. In an embodiment, all possible query execution plans considered by a query optimizer are retained in the form of abstract plans (APs). Each AP is then subsequently supplied with a query to test for stack traces and incorrect results that may occur during the execution of the query. An embodiment includes determining an optimizer efficiency index (OEI) by comparing each AP with a query execution plan chosen by the query optimizer and classifying the APs into various performance buckets based on the degree of improvement or degradation in performance with respect to the query execution plan chosen by the query optimizer. In another embodiment to determine the optimizer efficiency index, APs are ranked based on estimated cost and classified into a plurality of categories based on query optimizer estimates and actual execution behavior.

11 Claims, 7 Drawing Sheets

TESTING EFFICIENCY AND STABILITY OF A DATABASE QUERY ENGINE

BACKGROUND

1. Field of the Invention

The present invention is directed to testing the stability and efficiency of a database query engine.

2. Background Art

A query optimizer is a component of a database management system that attempts to determine the most efficient way to execute a query. If properly designed and implemented, query optimizers can significantly increase the efficiency of database management system (DBMS) query processing.

Testing the stability and efficiency of any database system is challenging because a query execution plan chosen by a query optimizer is influenced by factors that include the size of data, distribution of the data in underlying database tables, and also the type of query that is to be executed to manipulate the data, as well as other factors.

Different methods to test the performance of a query engine have been proposed. One such method of testing includes selecting a query with one or more predicates and providing it to a query optimizer within the DBMS. The query optimizer generates a query execution plan (QEP) and then the query is executed based on the generated QEP. A user may then use parameters, such as query execution time, to determine the query optimizer's performance.

One of the limitations of this method of testing is that the query optimizer is most likely to generate the same QEP for a given query that was previously generated for the same query. This limitation would exist if there were no changes to any underlying costing structure associated with the query optimizer between invocations of the query. As a result, when using this method, the query execution engine associated with the query optimizer would be tested for only a limited number of code or execution paths.

Accordingly, systems, methods and computer program products are needed that comprehensively test the stability and efficiency of a database query engine while overcoming the limitations of existing testing approaches.

BRIEF SUMMARY

Briefly stated, the invention includes system, method, computer program product embodiments and combinations and sub-combinations thereof for testing the stability of a database query engine and efficiency of a database query optimizer.

In an embodiment, possible query execution plans considered by a query optimizer are retained in the form of abstract plans (APs). Each AP is subsequently supplied with a query to test for stack traces and incorrect results that may occur during the execution of the query.

An embodiment includes determining an optimizer efficiency index (OEI) by comparing each AP with a query execution plan chosen by the query optimizer and classifying the APs into various performance buckets based on the degree of improvement or degradation in performance with respect to the query execution plan chosen by the query optimizer. In another embodiment to determine the optimizer efficiency index, APs are ranked based on estimated cost and classified into a plurality of categories based on query optimizer estimates and actual execution behavior.

In this way, embodiments of the invention provide a systematic way to test possible execution plans considered by the query optimizer, thereby extensively testing the database query engine for latent errors.

Further embodiments, features, and advantages of the invention, as well as the structure and operation of the various embodiments of the invention are, described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for testing the stability of a database query engine and efficiency of a database query optimizer.

In an embodiment, possible query execution plans considered by a query optimizer are retained in the form of abstract plans (APs). Each AP is subsequently supplied with a query to test for stack traces and incorrect results that may occur during the execution of the query.

An embodiment includes determining an optimizer efficiency index (OEI) by comparing each AP with a query execution plan chosen by the query optimizer and classifying the APs into various performance buckets based on the degree of improvement or degradation in performance with respect to the query execution plan chosen by the query optimizer. In another embodiment to determine the optimizer efficiency index, APs are ranked based on estimated cost and classified into a plurality of categories based on query optimizer estimates and actual execution behavior.

In this way, embodiments of the invention provide a systematic way to test each and every possible execution plan considered by the query optimizer, thereby extensively testing the database query engine associated with the query optimizer for latent errors.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

DBMS Overview

Figure 1:
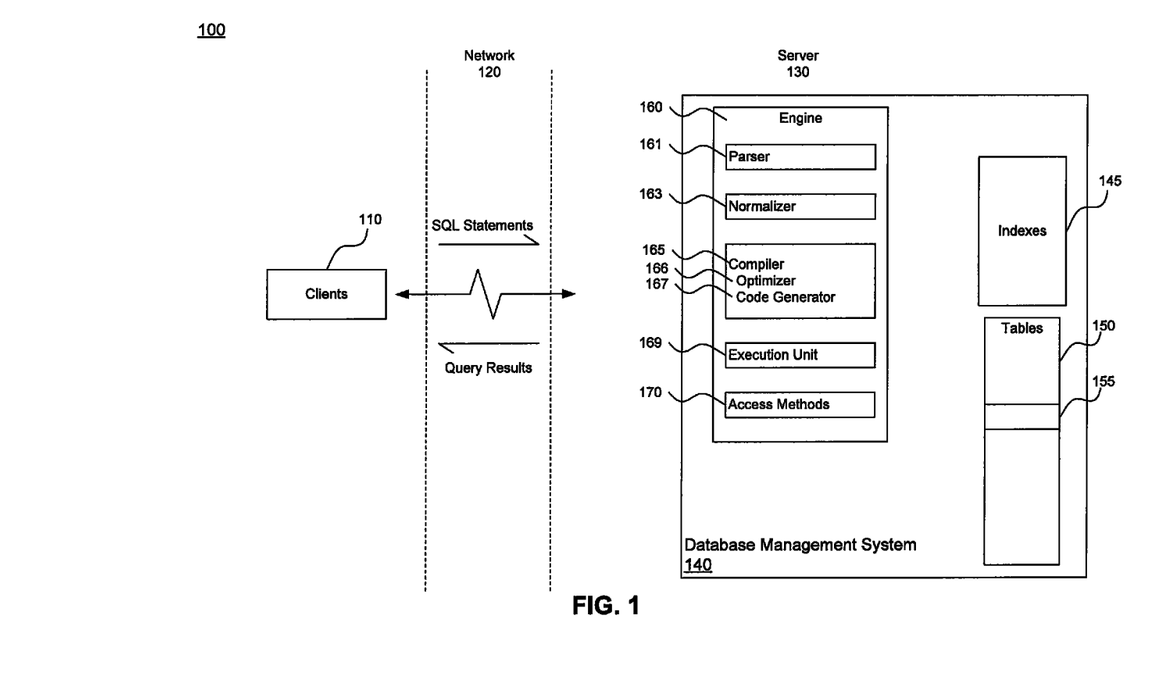
FIG. 1 illustrates an exemplary database management system (DBMS), according to an embodiment of the invention.

Embodiments of the invention may operate in the example client/server database system 100 shown in FIG. 1. System 100 includes one or more clients 110 in communication with a server 130 via a network 120. A database management system (DBMS) 140 resides in the server 130. It is noted that the example client/server database system 100 is shown in FIG. 1 and discussed herein solely for purposes of illustration, and not limitation. The invention is not limited to the example of FIG. 1.

In operation, clients 110 store data in, or retrieve data from, rows 155 of database tables 150 by issuing SQL statements to DBMS 140. SQL statements received from clients 110 are processed by query engine 160 of the DBMS 140. SQL is well known and is described in many publicly available documents, including "Information Technology—Database languages—SQL," published by the American National Standards Institute as American National Standard ANSI/ISO/IEC 9075: 1992, which is hereby incorporated by reference in its entirety.

In an embodiment, query engine 160 comprises parser 161, normalizer 163, compiler 165, query optimizer 166, code generator 167, execution unit 169 and access methods 170, which shall now be generally described.

SQL statements received from clients 110 are passed to the parser 161 which converts the statements into a query tree, which is a binary tree data structure that represents the components of the query in a format selected for the convenience of the system. In this regard, the parser 161 employs well known parsing methodology (e.g., recursive descent parsing).

The query tree is normalized by the normalizer 163. Normalization includes, for example, the elimination of redundant data. Additionally, the normalizer 163 may perform error checking, such as confirming that table names and column names which appear in the query are valid (e.g., are available and belong together). Finally, the normalizer 163 may also look up any referential integrity constraints which exist and add those to the query.

After normalization, the query tree is passed to the compiler 165, which includes query optimizer 166 and a code generator 167. Query optimizer 166 is responsible for optimizing the query tree. In an embodiment, query optimizer 166 performs a cost-based analysis for formulating a query execution plan. Query optimizer 166 will, for example, select the join order of tables, and select relevant indexes 145. Query optimizer 166, therefore, performs an analysis of the query and determines the best execution plan, from a plurality of generated execution plans, and where "best" is judged according to any defined criteria, which in turn results in particular access methods 170 being invoked during query execution by the execution unit 169.

Abstract Plan

Abstract Plan (AP) is a language interface to query optimizer 166, through which query optimizer 166 can be given a description of a desired query execution plan.

Generally, an AP expression provides a description of a query execution plan, at the level where query optimizer 166 makes decisions. As a purely illustrative example, an AP may describe a query execution plan but allows optimizer 166 to choose an appropriate implementation of the query execution plan.

AP language can also be considered to be a 2-way user-optimizer communication mechanism based on a physical level relational algebra. AP expressions are used both by query optimizer 166 to describe the plan that it selected, and by a user to direct the query optimizer choices. APs are not textually part of the query.

An exemplary AP language is the SYBASE Adaptive Server Enterprise (ASE) Abstract Plan (AP) language, which is mentioned herein solely for purposes of illustration and not limitation. APs are described in greater detail in a number of publicly available documents such as U.S. Pat. No. 6,618,719, entitled "Database System with Methodology for Reusing Cost Based Optimization Decisions," which is incorporated by reference herein in its entirety.

Although the following is described in terms of APs, it is to be appreciated that embodiments of the invention can be equally applied towards all forms of query execution plans, including but not limited to APs.

Testing Strategies

In an embodiment, query optimizer 166 can be configured for retaining (store) all possible query execution plans for a given query, which can then be used to execute the query. As an example, such operation may be achieved through an AP enumeration option associated with query optimizer 166. In this way, AP enumeration can help in verifying correctness of query execution plans. AP enumeration could also be used to identify better performing plans that are not being chosen by query optimizer 166.

Figure 2:
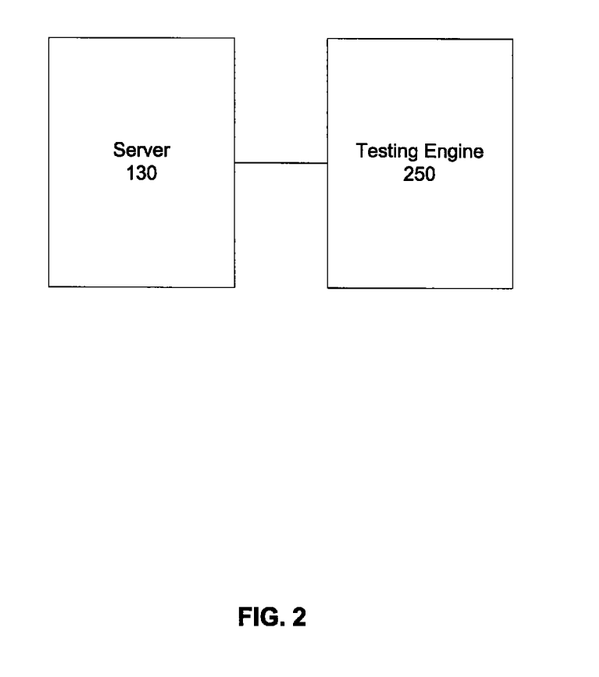
FIG. 2 illustrates a testing engine, according to an embodiment of the invention.

As an example, assume there are 'n' APs, namely, $p_1$ through $p_n$. In an embodiment, query optimizer 166 applies these n APs, sequentially, towards the execution of each query. In this way, since a query is executed based on each and every AP ($p_1$ through $p_n$), a user testing query engine 160 effectively obtains a result as if query optimizer 166 were not present in query engine 160. This is because query optimizer 166 would have selected a single AP for a given query (e.g. abstract plan pi). However, because embodiments of the invention allow all APs considered by query optimizer 166 to be applied towards the execution of a query, testing by testing engine 250 is made independent of query optimizer 166 as execution is no longer limited to a single AP for all queries. In an embodiment, not intended to limit the invention, enumeration of APs occurs within query engine 160, however steps of reading APs one by one and applying these towards the execution of a query are accomplished by testing engine 250. The operation of testing engine 250 is described further below.

Thus, using the AP enumeration option, query optimizer 166 can be configured in a manner that it generates and retains all abstract plans ($p_1$ through $p_n$), or any subset thereof. Otherwise, query optimizer 166 would disregard and not consider a number of APs while selecting only one plan for the execution of a given query.

In this way, embodiments of the invention provide a systematic way to test a plurality of possible execution plans considered by the query optimizer, thereby extensively testing the database query engine associated with the query optimizer for latent errors. Furthermore, for example, testing the stability of database query engine 160 may further include testing the stability of a parser 161, optimizer 166, access methods 170 and any other modules associated with query engine 160. This is because stack traces could occur anywhere in these modules and incorrect results could result because of latent errors in any of the above mentioned modules. Additionally, embodiments of the invention allow testing of efficiency of optimizer 166 in addition to the stability of optimizer 166. Thus, testing of stability, for example, may apply to all modules associated with query engine 160, however efficiency testing is that of optimizer 166.

As described earlier, using the AP enumeration option, query optimizer 166 can be configured in a manner that it generates and retains all abstract plans.

In an embodiment, testing engine 250 could use information obtained after applying the APs, towards the execution of queries, in two different testing methodologies, namely, a ranking methodology and a performance buckets methodology.

Ranking Methodology

In this embodiment, testing engine 250 ranks the query plans (APs) based on estimated cost. As an example, not intended to limit the invention, estimated cost could be based on the optimizer cost estimate of a query using the AP, resource consumption of the query, logical I/O, physical I/O, or a combination thereof. Also, these parameters are estimated by optimizer 166. Furthermore, for example, ranking, includes ordering all APs in an ascending manner based on a chosen parameter.

Testing engine 250 may classify these individual APs into a plurality of categories. In an embodiment, not intended to limit the invention, testing engine 250 may categorize individual APs into three categories. These exemplary categories are illustrated in Table 1.

TABLE 1

| Category I | Includes top 20 or 20% of APs. |
| Category II | Includes the middle 60% of APs |
| Category III | Includes bottom 20% of Aps |

As illustrated in exemplary Table 1, category I includes the top 20 or 20% of APs based on their estimated cost. Category II includes the middle 60% of the APs and category III includes the bottom 20% of APs categorized by testing engine 250 based on their estimated cost.

Now, testing engine 250 correspondingly forms Category I, II, and III based on the actual execution time parameter values using the APs. As an example, when categories (Category I-III) are formed based on execution time, such categories are formed using actual execution time of a query (e.g. elapsed time). Table 2 illustrates such exemplary categories. As shown in Table 2, abstract plans AP11 and A12 are categorized into category I based on optimizer estimates. In a similar manner, abstract plans AP11 and AP12 are categorized based on actual execution behavior observed by testing engine 250.

TABLE 2

| Category | Categorized based on Optimizer Estimates | Categorized based on observed Actual Execution behavior |
|---|---|---|
| Category I | AP11, AP12, ... | AP'11, AP'12, ... |
| Category II | AP21, AP22, ... | AP'21, AP'22, ... |
| Category III | AP31, AP32, ... | AP'31, AP'32, ... |

Such categorization by testing engine 250 allows testing engine 250 to verify if the APs that fall in each category based on optimizer estimates also fall in the corresponding category based on actual execution behavior. Furthermore, for example, the ordering of the APs within a category may not be as important as the fact that they belong to the same category.

As an example, not intended to limit the invention, an optimizer efficiency index or (OEI) may determined as follows.

Optimizer Efficiency Index {Ranking Methodology} =

$$\frac{\text{Number of } APs \text{ that are present in Category } I \text{ based on execution behavior}}{\text{Number of } APs \text{ that are present in Category } I \text{ based on optimizer estimates}}$$

The above method of obtaining the OEI as a ratio of the number of APs that are present in Category I based on execution behavior to those APs that are in category I based on optimizer estimates, allows testing engine 250 to identify the number of plans that were categorized into Category I, based on optimizer 166 estimates, that also were categorized into Category I based on observed execution behavior.

As an example, an OEI would be a value that lies between 0 and 1 (e.g. in the interval [0,1]). Furthermore, for example, an OEI value of 0 may indicate that optimizer 166 is inefficient while an OEI value of 1 indicates an efficient optimizer.

Performance Buckets Methodology

FIG. 2 illustrates testing engine 250, which determines an efficiency of query optimizer 166, according to an embodiment of the invention.

In an embodiment, each of the APs, $p_1$ through $p_n$, have an estimated cost associated with them which is determined by query optimizer 166. Such cost may reflect processing resources needed to process a given AP, or may be based on any other defined factors(s). Testing engine 250 may then use an AP, estimated cost and an actual cost determined by the execution of the query based on the AP to calculate an efficiency of query optimizer 166. Also, testing engine 250 may use the estimated cost and the actual cost to calculate parameters other than the efficiency of query optimizer 166.

In an embodiment, testing engine 250 classifies APs into several performance buckets, each performance bucket representing the performance of an AP relative to the performance of a query execution plan that was chosen by query optimizer 166. As an example, not intended to limit the invention, performance of an AP could be based on the execution time of a query using the AP, resource consumption of the query, logical I/O, physical I/O, or a combination thereof.

Assume, for example, that there are 'n' APs being considered and query optimizer 166 selects one AP out of the 'n' APs. Let this selected plan be the default plan '$p_d$'. Testing engine 250 then compares every other AP considered by query optimizer 166 against default plan '$p_d$' and sorts these compared APs into a plurality of performance buckets.

In another example, testing engine 250 compares the actual cost ($c_j$) of an AP with the cost of default plan $p_d$. As an example, the cost associated with an AP could be the execution time, a combination of logical and physical I/O incurred or the resource consumption. If an AP, with actual cost $c_j$, performs better than plan $p_d$, it is placed in a positive performance bucket. However, if the AP performs worse than plan $p_d$, testing engine 250 may place it in a negative performance bucket. In this way, for example, APs may be distributed (grouped) in positive or negative performance buckets relative to the default plan (AP) chosen by optimizer 166.

After the classification of the AP's based on its performance relative to the default plan chosen by optimizer ($P_d$), the OEI using the performance buckets methodology may be determined as, $$\text{Optimizer Efficiency Index \{Performance Buckets Methodology\}} = \frac{(\text{Number of total } APs) - (\text{No. of plans in positive performance buckets})}{\text{Number of total } APs}$$

As described earlier, the OEI could be a value between 0 and 1 (e.g. the interval (0, 1)). Furthermore, for example, the OEI value of 0 may indicate that optimizer 166 is inefficient while the OEI value of 1 indicates that optimizer 166 is efficient.

Although OEI based on the performance buckets methodology and ranking methodology are distinct and provide an efficiency of optimizer, embodiments of the invention and testing engine 250 may determine other indexes based on these parameters.

Figure 3:
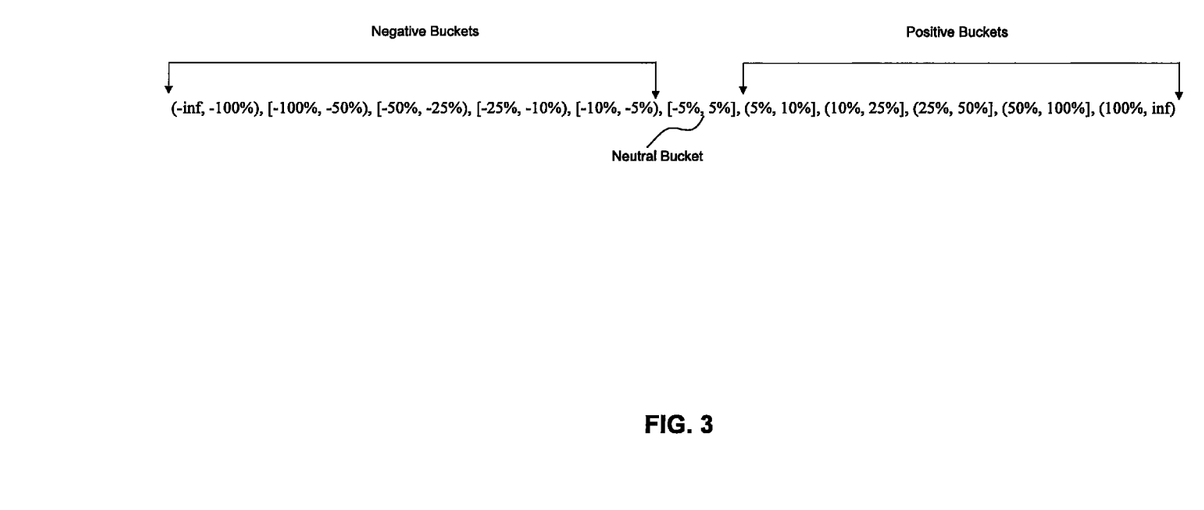
FIG. 3 illustrates exemplary performance buckets, according to an embodiment of the invention.

FIG. 3 illustrates exemplary performance buckets that are used by testing engine 250 to organize APs based on their performance.

Referring to FIG. 3, if an AP performs 26% better than a query execution plan chosen by query optimizer 166, then it would be classified in the interval (25%, 50%] by testing engine 250.

In another example, performance bucket (10%, 25%] is used to retain a query execution plan that is 20% better than default plan $p_d$. In a similar manner, bucket [−25%, −10%) used to retain a query execution plan that performs 20% worse than default plan $p_d$. Other performance buckets shown in FIG. 3 are used to retain query execution plans that show other increases or decreases in performance.

In this way, if testing engine 250 determines that there are almost no plans that perform better that the default plan $p_d$ selected by query optimizer 166, it may determine that the query optimizer 166 is efficiently performing the task of optimizing queries.

It is to be appreciated that the performance values and performance bucket intervals shown in FIG. 3 are used for illustrative purposes and are not intended to limit the invention. Other performance intervals such as but not limited to [−75%, −50%) or (25%, 60%] may be used.

As illustrated in FIG. 3, there exist pluralities of performance buckets (categories or groups), each configured to retain APs that are considered by query optimizer 166. Based on the performance degradation or enhancement, these buckets are configured to retain different APs. Thus, testing engine 250 compares each query execution plan considered by query optimizer 166 with the default plan $p_d$ and if it determines that a given plan performs better than $p_d$, it is placed in a positive or a negative performance bucket based on the enhancement or degradation associated with that AP.

Once testing engine 250 has compared all plans considered by query optimizer 166, it may then determine a count of the number of APs that have been classified into positive performance buckets and those that have been classified into negative performance buckets.

In an embodiment, if there are a significantly more APs in the negative performance buckets as compared to the positive performance buckets, testing engine 250 determines that query optimizer 166 is performing efficiently. This is because query optimizer 166 is efficiently eliminating a substantial number of plans whose performance is less efficient as compared to default plan $p_d$.

If there are significantly more plans in the positive performance buckets as compared to the negative performance buckets, testing engine 250 determines that query optimizer 166 is not performing efficiently. This is because query optimizer 166 is ignoring a substantial number of plans whose performance is more efficient as compared to default plan $p_d$. The performance of query optimizer 166 would be more efficient if it had considered and used those ignored plans to execute queries.

An exemplary operation of testing engine 250 using the performance buckets methodology, according to an embodiment of the invention, will now be described in detail with reference to flowchart 400 in FIG. 4A.

In step 402, method 400 begins and testing engine 250 compares the performance of an AP considered by query optimizer 166 with a default plan, $p_d$, that has been selected by optimizer 166. As an example, not intended to limit the invention, performance of an AP could be based on the execution time of a query using the AP or any other defined factors.

In step 404, if the AP performs better than plan $p_d$, it is placed in a positive performance bucket by testing engine 250 (step 406) and method 400 proceeds to step 410.

Returning to step 404, if the AP performs worse than plan $p_d$, testing engine 250 places it in a negative performance bucket (step 408) and method 400 proceeds to step 410.

In an embodiment, testing engine 250 performs steps 402 though 408 for all query execution plans that are considered by query optimizer 166.

In step 410, testing engine 250 counts the number of APs in the positive performance buckets and negative performance buckets.

Testing engine 205 then computes the OEI using the performance buckets methodology (step 412), and determines if query optimizer 166 is performing efficiently (step 414). As an example, testing engine 250 determines if query optimizer 166 is performing efficiently by comparing the computed OEI with a preset threshold OEI value. Furthermore, for example, testing engine 250 may alter preset OEI values based on the overall performance of applications based on these APs, creating a learning framework for testing of query optimizer 166.

If there are a significantly less APs in the negative performance buckets as compared to the positive performance buckets, testing engine 250 determines that query optimizer 166 is performing inefficiently (step 416).

"Significant" is a threshold which may be user or system defined. In an embodiment, "significant" is a simple majority. In other embodiments, "significant" may be a user-defined super majority.

In this way, the distribution of APs in the performance buckets provides helps to determine an efficiency and effectiveness of query optimizer 166.

An exemplary operation of testing engine 250 using the ranking methodology, according to an embodiment of the invention, will now be described in detail with reference to flowchart 420 in FIG. 4B.

In step 422, method 400 begins and testing engine 250 ranks the APs based on estimated cost.

In step 424, testing engine 250 categorizes the APs into a plurality of categories based on their actual execution cost. As described earlier, testing engine 250 may categorize the APs into three different categories, such as Category I, Category II and Category III.

In step 426, testing engine 250 may compute the OEI, using the ranking methodology, and determines if query optimizer 166 is performing efficiently (step 428). As described earlier, testing engine 250 determines if query optimizer 166 is performing efficiently by comparing the computed OEI with a preset threshold OEI value.

In this way, the distribution of APs into a plurality of categories based on a ranking methodology can allow testing engine 250 to determine the efficiency of query optimizer 166.

Testing engine 250 may utilize preset OEI values to determine if query optimizer 166 is performing efficiently. As described earlier, the OEI could be a value between 0 and 1 (e.g. the interval (0, 1)). Furthermore, for example, the OEI value of 0 may indicate that optimizer 166 is inefficient while the OEI value of 1 indicates an efficient optimizer. In another example, testing engine 250 could classify query optimizer 166 as being efficient if, for each 100 plans considered by query optimizer 166, 10 plans are classified into positive performance buckets. Similarly, testing engine 250 would classify query optimizer 166 as being inefficient if 15 plans are classified into positive performance buckets. In an embodiment, testing engine 250 may alter preset OEI values based on the overall performance of applications based on these plans, creating a learning framework for testing of query optimizer 166.

In another embodiment for testing, all query execution plans considered by query optimizer 166 are ranked by testing engine 250 based on their actual execution cost. As an example, ranking the query execution plans based on estimated cost or execution time should ideally yield similar results.

In contrast to previous testing approaches known to those skilled in the art, embodiments of the present invention consider all plans that are generated by query optimizer 166, thereby extensively testing the database query engine associated with the query optimizer for latent errors.

Exemplary Testing Approach

Figure 5:
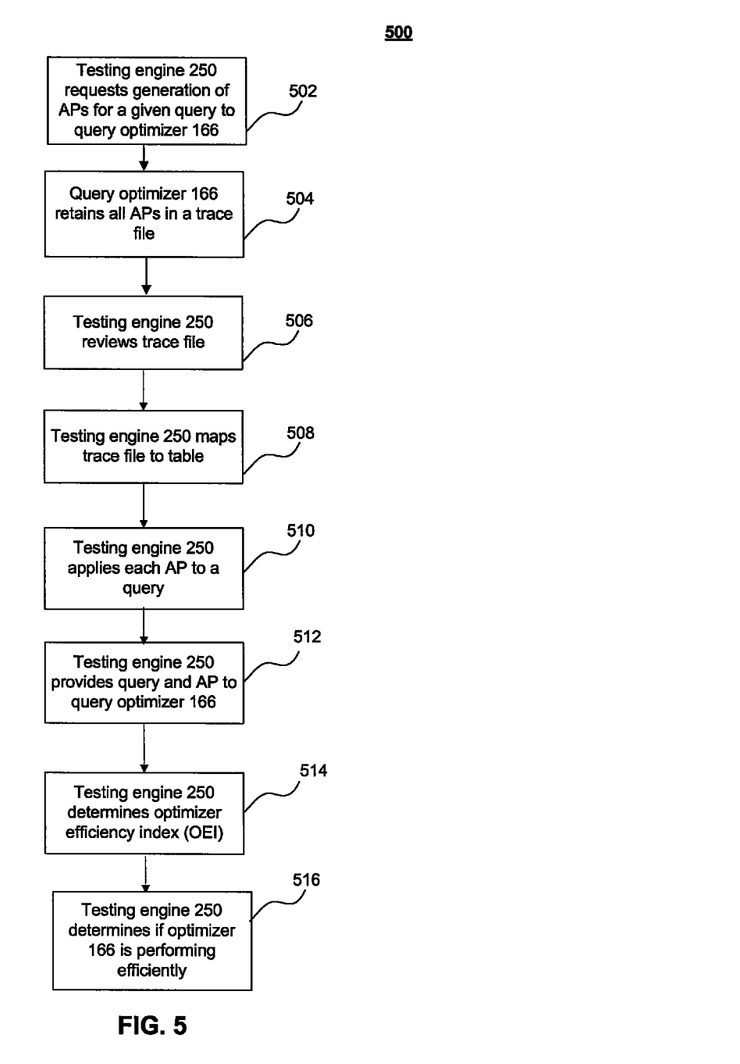
FIG. 5 is a flowchart illustrating an exemplary testing approach, according to an embodiment of the invention.

An exemplary testing approach, according to an embodiment of the invention, will now be described in detail with reference to flowchart 500 in FIG. 5.

In step 502, method 500 begins and testing engine 250 requests query optimizer 166 to generate plurality of APs for a given query.

In step 504, query optimizer 166 proceeds to retain (store) all the APs. As an example, query optimizer 166 may retain all APs by printing them out to a trace file as one or more APs. APs may be stored in the trace file in a format that lists a cost associated with each AP (e.g. AP-AP Cost). Furthermore, such a format allows the information to be mapped to a table in server 130. As an example, the cost associated with the APs in stored in the trace file is the estimated cost associated with those APs.

In an embodiment, not intended to limit the invention, steps 502 though 504 are performed by the query engine 160 or server 130.

Returning to step 504, once all the APs are retained (stored) by query optimizer 166, testing engine 250 reviews all the APs and their corresponding cost from the trace file (step 506).

In step 508, testing engine 250 maps the trace file to a table and reads each AP from the trace file.

In step 510, testing engine 250 applies each AP to the query and sends them to query optimizer 166 for subsequent execution by execution unit 169 (step 512).

Figure 4A:
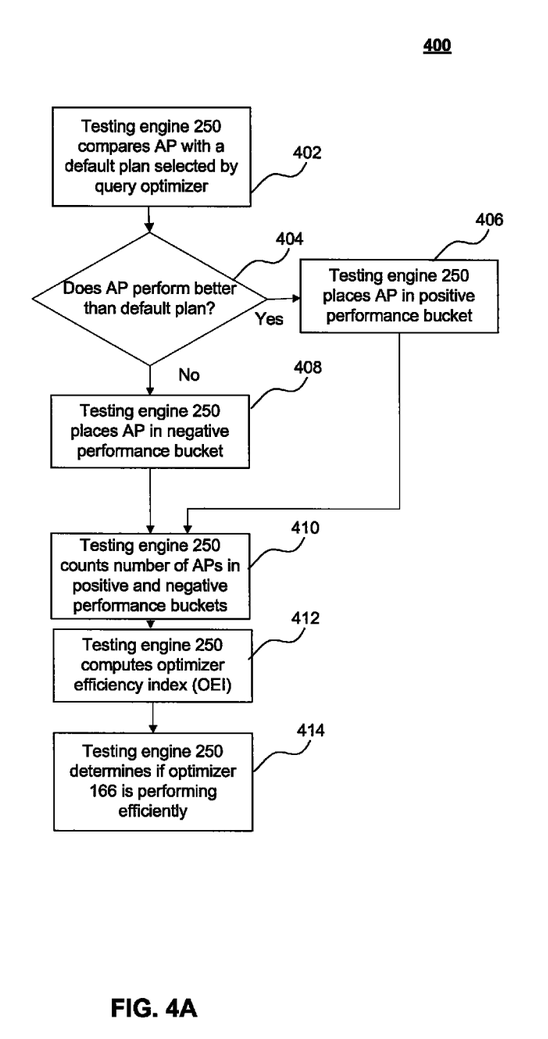
FIG. 4A is a flowchart illustrating an exemplary operation of a testing engine, according to an embodiment of the invention.
Figure 4B:
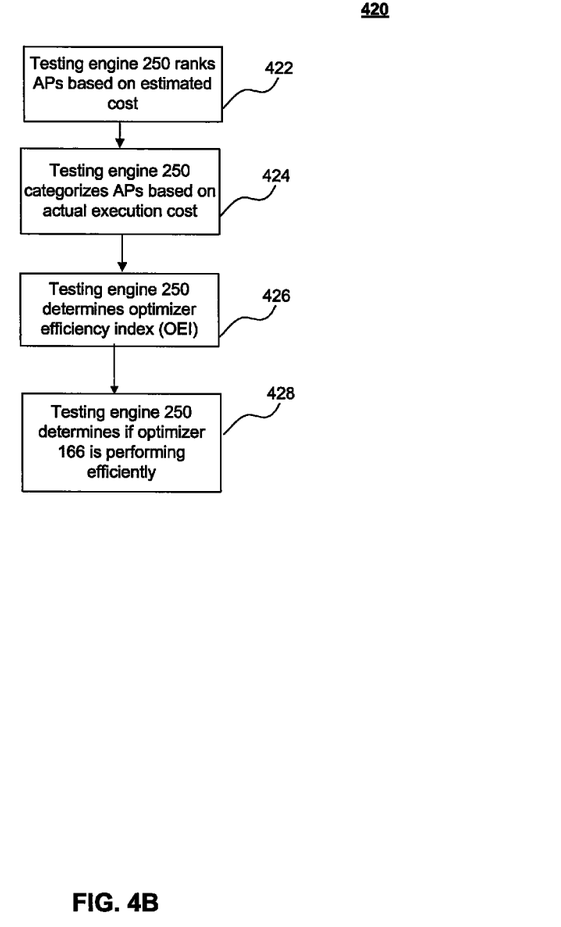
FIG. 4B is a flowchart illustrating an exemplary operation of a testing engine, according to another embodiment of the invention.

In step 514, testing engine 250 operates as shown in FIG. 4A or FIG. 4B, to determine the optimizer efficiency index (OEI) based on both the ranking and performance buckets methodology and determines if optimizer 166 is performing efficiently (step 516) as described earlier.

In this way, embodiments of the present invention consider all plans that are generated by query optimizer 166, thereby extensively testing the database query engine associated with query optimizer 166 for latent errors.

Example Computer Embodiment

Figure 6:
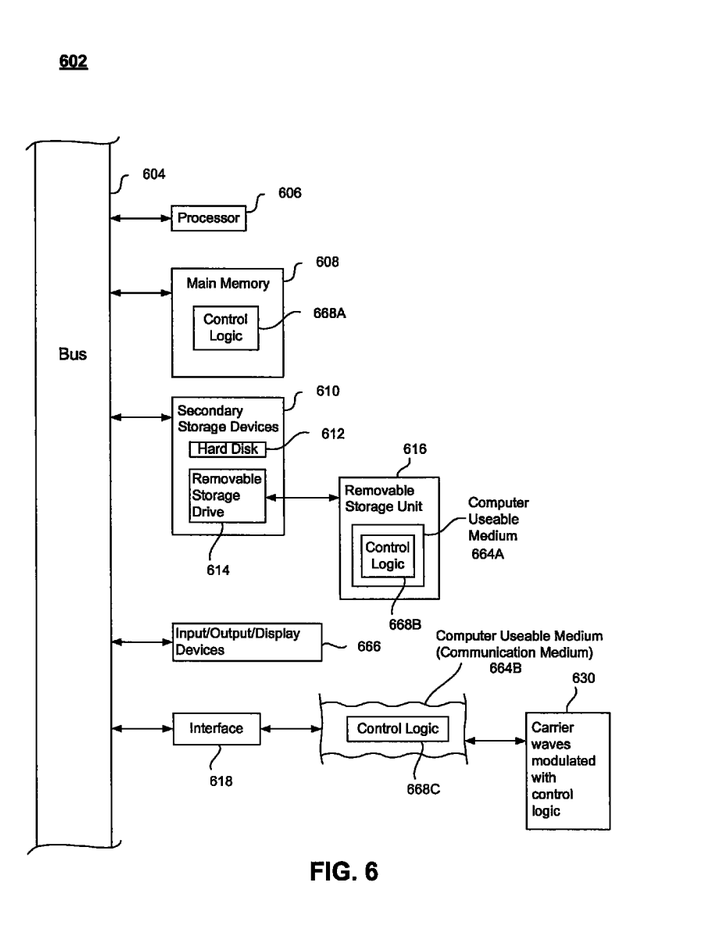
FIG. 6 illustrates an example computer useful for implementing components of embodiments of the invention.

In an embodiment of the present invention, the system and components of embodiments described herein are implemented using well known computers, such as example computer 602 shown in FIG. 6. For example, database management system 140 or server 130 can be implemented using computer(s) 602.

The computer 602 can be any commercially available and well known computer capable of performing the functions described herein, such as computers available from International Business Machines, Apple, Sun, HP, Dell, Compaq, Digital, Cray, etc.

The computer 602 includes one or more processors (also called central processing units, or CPUs), such as a processor 606. The processor 606 is connected to a communication bus 604.

The computer 602 also includes a main or primary memory 608, such as random access memory (RAM). The primary memory 608 has stored therein control logic 626A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624 having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 622, such as monitors, keyboards, pointing devices, etc.

The computer 602 further includes a communication or network interface 618. The network interface 618 enables the computer 602 to communicate with remote devices. For example, the network interface 618 allows the computer 602 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from the computer 602 via the communication medium 624B. More particularly, the computer 602 may receive and transmit carrier waves (electromagnetic signals) modulated with control logic 630 via the communication medium 624B.

Any apparatus or manufacture comprising a computer useable or readable medium having control logic (software) stored therein is referred to herein as a computer program product or program storage device. This includes, but is not limited to, the computer 602, the main memory 608, secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method in a database management system (DBMS), comprising:
    receiving a query;
    generating a plurality of query execution plans for the query, wherein estimated costs corresponding to each of the plurality of execution plans are determined by a query optimizer prior to (i) an execution of the query using the plurality of query execution plans and (ii) a selection of a query execution plan by the query optimizer;
    executing the query using each of the plurality of query execution plans;
    determining performance of each of the query execution plans based on the execution of the query using the query execution plans;
    classifying each of the query execution plans based on the performance and the corresponding estimated costs; and
    computing an optimizer efficiency index based on the classifying of the query execution plans, wherein the efficiency index is utilized to determine efficiency of the query optimizer.

2. The method of claim 1, further comprising:
    retaining said query execution plans as abstract plans (APs).

3. The method of claim 1, further comprising:
    checking for incorrect results and stack traces during execution of said query using said query execution plans.

4. The method of claim 1, wherein said determining further comprises:
    comparing said performance of said query execution plans with performance of said query execution plan selected by said query optimizer.

5. The method of claim 4, wherein said determining further comprises:
    classifying said query execution plans into a plurality of performance categories based on said comparing.

6. The method of claim 5, wherein said classifying comprises:
    classifying a compared query execution plan into a positive performance category if said compared query execution plan performs better than said selected query execution plan; and
    classifying said compared query execution plan into a negative performance category if said compared query execution plan performs worse than said selected query execution plan.

7. The method of claim 1, further comprising, ranking said query execution plans based on estimated cost; and
    classifying said query execution plans into a plurality of categories based on actual execution behavior.

8. The method of claim 7, wherein said actual execution behavior is based on a execution time associated with said query execution plans, resource consumption of said query execution plans, and logical I/O and physical I/O associated with said query execution plans.

9. The method of claim 7, wherein said estimated cost is based on a combination of logical I/O and physical I/O associated with said query execution plans.

10. The method of claim 1, further comprising:
    retaining said query execution plans by storing said query execution plans to one or more trace files as abstract plans.

11. A computer program product including a non-transitory computer-readable storage medium having instructions stored thereon that, in response to execution by a computing device, causes the computing device to perform operations comprising:
    receiving a query;
    generating a plurality of query execution plans for the query, wherein estimated costs corresponding to each of the plurality of execution plans are determined by a query optimizer prior to (i) an execution of the query using the plurality of query execution plans and (ii) a selection of a query execution plan by the query optimizer;
    executing the query using each of the plurality of query execution plans;
    determining performance of each of the query execution plans based on the execution of the query using the query execution plans;
    classifying each of the query execution plans based on the performance and the corresponding estimated costs; and computing an optimizer efficiency index based on the classifying of the query execution plans, wherein the efficiency index is utilized to determine efficiency of the query optimizer.

* * * * *